June 4, 1946.  T. C. KILLORAN  2,401,426
REFRIGERATING APPARATUS
Filed Aug. 20, 1942
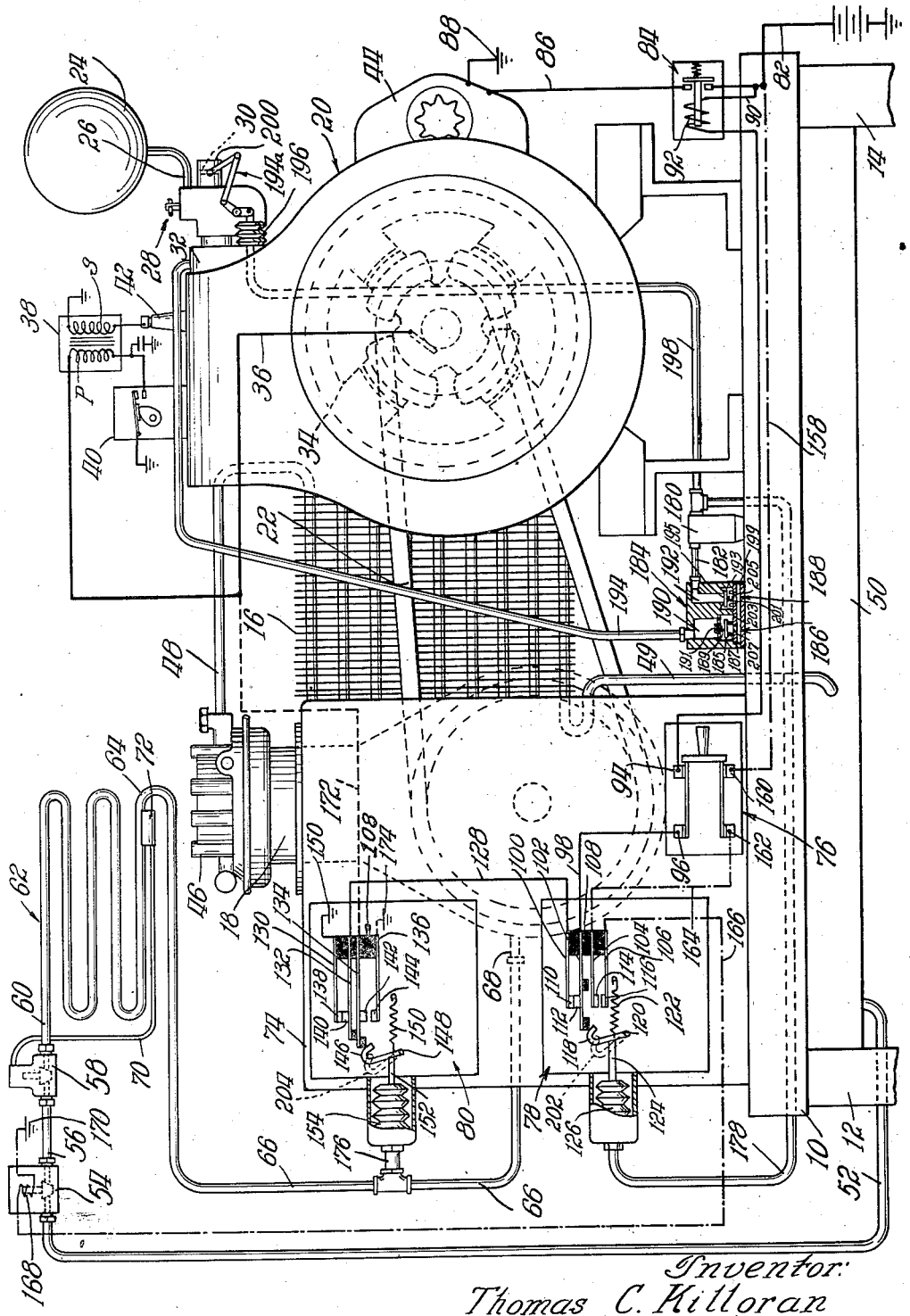
Inventor:
Thomas C. Killoran
By Stone, Artman & Bisson Att'ys Patented June 4, 1946

2,401,426

UNITED STATES PATENT OFFICE 2,401,426

REFRIGERATING APPARATUS

Thomas C. Killoran, Antioch, Ill.

Application August 20, 1942, Serial No. 455,415

14 Claims. (Cl. 62—117)

This invention relates to refrigerating apparatus and is a continuation of all parts common to applicant's abandoned application Serial No. 292,487 filed August 29, 1939 which was copending herewith. More particularly this invention relates to a refrigerating apparatus for use on trucks and semi-trailers.

The first object of this invention is to provide an automatically controlled refrigerating apparatus powered by a one-cylinder internal combustion engine. So much difficulty has been encountered heretofore in functioning automatic refrigerating mechanism controls from pressure changes in the manifold of a four-cycle, single cylinder internal combustion engine, that it is common practice to employ continuously operating gas engine refrigerating systems with all the drawbacks that such continuously operating systems entail. The difficulty arises from the fact that a single cylinder, four-cycle internal combustion engine, having only one intake stroke for each four cycles, is unable to maintain in the manifold a reduced pressure which is sufficiently constant to indicate continuous functioning of the engine. One of the features of applicant's invention is the provision of a vacuum control which will establish in a vacuum chamber a fairly constant reduced pressure or vacuum while the engine is running. This vacuum control is capable of isolating the vacuum chamber from the pressure increases in the manifold occurring during the three non-intake cycles of the engine.

A second object of this invention closely associated with the first object is to employ the substantially constant vacuum as a means of disabling a starter circuit which initially connected an engine starter to an electrical source of power so as to turn over the flywheel of the internal combustion engine and start the system.

Another object of this invention is to provide a new and improved means for stopping the refrigerating apparatus when a predetermined low temperature of the system's evaporator or cooling coils has been reached. In this connection, applicant employs a superheat control bulb mounted on the suction side of the evaporator coils, together with a small bore tube which transmits pressure changes from said bulb to a thermostatic expansion valve for controlling the opening and closing of said valve which operates, when open, for admitting refrigerant to the evaporator coils at the inlet. Connected to the low side of the refrigerating system, that is, to the suction side of the evaporator, is a bellows controlled switch biased against a spring in such a manner that when the capillary tube responds to a sufficiently low temperature to close the refrigerant delivery to the evaporator coil, the exceptionally low pressure that will then be developed in the suction line of the evaporator or the low side of the compressor will cause this switch to close and thereby ground the magneto of the internal combustion engine which is supplying the necessary spark to keep the engine operating.

A further object of this invention is to provide a choke control responsive to the substantially constant reduced pressure provided by applicant's vacuum control so as to facilitate the starting of the engine by increasing the percentage of gasoline in the mixture delivered to the internal combustion engine.

These and such other objects as may hereinafter appear are obtained in one embodiment of the invention shown in the drawing wherein a refrigerating apparatus powered by an internal combustion engine is shown in dotted lines with applicant's vacuum control system shown in solid lines and the electrical circuits shown in either solid lines or distinctive broken lines.

Continuing to refer to the drawing, the numeral 10 identifies a supporting base having a plurality of legs such as 12 and 14. Mounted on the base 10 toward the back thereof is a condenser coil 16 extending substantially the full width of the base 10. Adjacent to the condenser coil 16 is a refrigerating compressor 18 and a four-cycle, single cylinder internal combustion engine 20, both of which are mounted on the base 10 and which are maintained in operable relationship to each other by a drive belt 22 which operates over pulleys in the conventional manner.

Conventional means for supplying the internal combustion engine with fuel and the necessary spark comprise a gas tank 24 supplying gasoline by conduit 26 to a carburetor 28 having a choke valve 30. The carburetor 28 communicates with a manifold 32, which in turn communicates with the cylinder head. 34 indicates a magneto from which a conductor 36 is adapted to impress electrical potential onto the primary winding P of an ignition transformer or coil 38. A circuit interrupter 40, connected in series with the conductor 36 and said ignition coil primary, is operated coordinately with the engine to open the potential supply circuit for the ignition coil primary and thus induce a high potential in the coil secondary S and hence upon the engine spark plug 42 each time fuel is compressed in the engine cylinder. The conductor 36 forms part of a disabling circuit, hereinafter described, which is shown by long dashes.

An electric powered starter 44 constitutes the means for cranking the internal combustion engine 20.

The refrigerant circulatory system includes the compressor 18, the compressed gas leaving the head 46 of the compressor by the pipe 48 by which it is led to the condenser 16 and thence through a pipe 49 to a reservoir 50. Refrigerant may leave the reservoir 50 by the conduit 52 by which it reaches a valve 54, which hereinafter will be referred to as the refrigerant supply valve. When the refrigerant supply valve 54 is open, the refrigerant may continue through the conduit 56 to a thermostatic expansion valve 58 which is hereinafter referred to as the capillary control valve since it is operably connected with the temperature responsive bulb 72 by the tube 70 having a small bore. When the capillary control valve 58 is open the refrigerant may flow therethrough and the conduit 60 to the evaporator 62. Upon a predetermined rise in temperature of the wall portion of the evaporator 62 upon which the bulb 72 is mounted, increased pressure thus generated in said bulb will be communicated through the tube 70 for opening the capillary control valve 58 and thus permitting refrigerant to flow from the conduit 56 into the evaporator 62. The outlet or suction end of the evaporator 62, which is designated by the numeral 64, is connected by a conduit 66 to the suction or low side 68 of the compressor 18. It will be appreciated that the evaporator 62 will be located in the space to be cooled and will be of whatever configuration is best adapted to perform the cooling function in that space.

Mounted on the base 10 in front of the compressor 18 is a switch panel 74. On this panel 74 three switches are disposed, namely, a master switch 76, a starter break switch 78 and a disabling switch 80 for disabling the internal combustion engine and causing the refrigerating apparatus to stop.

It will be understood that in rendering a refrigerating apparatus automatic, of the type thus far described, it is necessary to start the apparatus when the temperature of the evaporator 62 has risen to a predetermined point. This necessitates energizing the electric starter 44. After the internal combustion engine 20 has commenced to function, it is necessary to open the electric circuit to the starter 44 automatically. After the apparatus has functioned sufficiently long to lower the temperature of the evaporator 62 to a predetermined point, it is necessary to stop the internal combustion engine, and at this time to condition the starter circuit so that it will function the starter when the evaporator rises to a selected temperature. Additionally applicant has found it desirable to positively and automatically control the flow of refrigerant to the evaporator by means of the valve 54, thereby precluding leakage of refrigerant through the expansion valve 58 into the expansion coils during shut-down periods without the necessity for a float valve commonly used in other systems for this purpose. Applicant utilizes, therefore, three circuits which he identifies as the starter circuit, the refrigerant control circuit, and the disabling circuit. These will be described in order.

The starter circuit

The starter circuit including the source of power conductor is shown in a solid line. The numeral 82 identifies the ungrounded or "hot" line of an electrical source of power. This line is connectable through a solenoid switch 84, schematically shown, and a conductor 86 with the starter 44 which is grounded at 88. The solenoid switch 84 is spring biased so as to be open when its coil 92 is unenergized. The ungrounded line 82 is tapped by a conductor 90 which leads through the coil 92 of the solenoid switch 84 and thence to a post 94 of the master switch 76. As illustrated, the master switch 76 is a double-pole single-throw knife switch. When the master switch 76 is in closed position, current will flow to a post 96 and thence by a conductor 98 into the starter break switch 78. The starter break switch 78 is shown for convenience as a multiple leaf switch wherein the leaves 100, 102, 104 and 106 are held at one end by insulators 108 and may be connected to each other through contacts 110 and 112 and 114 and 116 depending upon the position of an arm 118 pivoted at 120 and biased toward its full line position by a spring 122. The position of the arm 118 is controlled by a reciprocable link 124 responsive to a bellows 126. The position of the arm 118 shown in the drawing in solid lines is the position occupied thereby when the bellows 126 is expanded, that is, when the bellows is not drawing against the spring 122.

Resuming the tracing of the starter circuit, the current is conducted through leaf 102, the contacts 112 and 110 to the leaf 100 and thence out of the starter break switch 78 by the conductor 128 to the disabling switch 80. The disabling switch is schematically shown and is similar to the starter break switch 78. It has four leaves 130, 132, 134 and 136 and four contact points 138, 140, 142 and 144. Its control arm bears the numeral 146 and this control arm is pivoted at 148 and biased toward its full-line position by a spring 150. It moves in response to the reciprocable link 152 which in turn is controlled by a bellows 154. Resuming the tracing of the starter circuit, the conductor 128 is connected to the leaf 132, which when the disabling switch 80 is in the condition shown is conductively related to the leaf 130 by the contacts 138 and 140. The leaf 130 is grounded at 150.

The refrigerant control circuit

The refrigerant control circuit is shown in the drawing by a dot-dash line and comprises a conductor 158 tapped to the ungrounded line 82 and leading to a post 160 of the master switch 76. When the master switch 76 is in the closed position, current from the conductor 158 will reach the post 162 and thence by conductor 164 will reach the starter break switch 78 where the conductor 164 is connected to the leaf 104. When the contacts 114 and 116 of the starter break switch are in contact, the current will flow from the leaf 104 to the leaf 106. Thence by a conductor 166, the current will be communicated to a solenoid 168 of the refrigerant control valve 54. The solenoid 168 is grounded at 170.

The disabling circuit for the internal combustion engine

The disabling circuit is shown by long dashes. The conductor 36 which indirectly connects the magneto 34 to the spark plug 42 is tapped by a conductor 172 which leads to the leaf 134 of the disabling switch 80. When the contacts 142 and 144 are in engagement, the conductor 172 will be connected through the leaf 136 to a ground 174.

The means for controlling the disabling switch 80

The bellows 154 of the disabling switch 80 is connected by a conduit 176 to the suction conduit 66 from the evaporator 62. The bellows works against the spring 150, the tension of which is so adjusted that the bellows 154 will not be able to move the arm 146 to the open position of the disabling circuit switch 80 until the pressure in the suction conduit 66 has dropped following closing of the valve 58 under control of the bulb 72.

The means for controlling the starter break switch 78

The bellows 126 of the starter break switch 78 is connected by a conduit 178 to a vacuum chamber 180. The vacuum chamber 180 is connected by a conduit 182 to a vacuum control unit 184. The vacuum control unit 184 consists essentially of a double valve consisting of the valve unit 186 and the valve unit 188. Valve unit 186 includes a wafer 185 normally held in valve-closing relation upon an annular seat 187 by the force of an expansion spring 189 which bears upwardly against a reaction member 191. Valve unit 188 includes a wafer 193 normally pressed in valve-closing relation upon an inverted annular seat 195 about the walls of an inlet chamber 192 of the casing 199 by the force of a spring 201 which reacts upon a plate 203 in said casing. A chamber 190 of the vacuum control unit 184 communicates with the manifold 32 through a conduit 194, wherefore upon the starting of the engine and the consequent lowering of the pressure in the manifold, will cause air within the parts connnected with the inlet side of the unit 184 to be withdrawn therethrough, such air passing into the chamber 192 from the conduit 182, thence through the valve 188 (of which the wafer 193 is then unseated by the relatively higher pressure in the chamber 192) thence through holes 205 and 207 in the plate 203, valve 186 (of which the wafer 185 is then unseated by the relatively greater pressure therebeneath), and thence through the chamber 190 and the conduit 194 to the manifold 32. Substantial equalization of pressure on opposite sides of the unit 184 will permit the wafers 185 and 193 to seat, closing their respective valves 186 and 188, and since these valves are in series no substantial flow rate of air reversely through the unit, that is, from the conduit 194 to the conduit 182, can occur.

By the arrangement described, therefore, the pressure in the vacuum chamber 180 will not follow the changes in pressure in the manifold 32 but rather, during engine operation, will remain near the lowest pressure attained in the manifold 32 on each intake stroke of the four cycle, single cylinder engine. As mentioned heretofore the pressure in the manifold 30 of a single cylinder four-cycle engine does not remain very constant because no suction is applied to the manifold on three of the four cycles of the engine, wherefore suction strokes occur at the low frequency of one for each two engine revolutions. By applicant's arrangement, on the suction cycle of the engine 20, the comparatively low pressure in the manifold 30 will be communicated through the wafer valves 186 and 188 to the vacuum chamber 180 to establish a relatively low pressure therein. On the next three cycles of the internal combustion engine 20 the pressure in the manifold 30 will rise substantially, but this rise in pressure will not be communicated to the vacuum tank 180 because of the closing of the two wafer valves 186 and 188. As will be understood from a description of the operation of this refrigerating apparatus, this is exceedingly important because the maintenance of a substantially constant low pressure in the vacuum chamber 180 maintains the bellows 126 of the starter break switch 78 in contracted position without permitting intermittent changes of position which would cause intermittent opening and closing of the refrigerant supply valve 54 and energization of the engine starter circuit.

The choke control

Referring now to the carburetor 28, the choke 30 is controlled by a linkage 194a which in turn is controlled by a bellows 196. The bellows 196 communicates by a conduit 198 to the vacuum chamber 180. The arrangement is such that the choke 30 is normally closed, that is, in the position shown when the bellows 196 is fully expanded, which occurs when the pressure in the conduit 198 is substantially the same as atmospheric pressure. Upon the development of a reduced pressure in the chamber 180, the bellows 196 contracts and opens the choke 30, thereby admitting more air to the gas mixture introduced to the manifold 30. This occurs when the engine is running normally.

Operation

In order that the full automatic functioning of applicant's device may be appreciated its operation will now be described. When the machine is not in functioning condition, the master switch 76 will be open. At such a time the pressure in the suction conduit 66 from the evaporator 62 will be high because the evaporator will approximate the temperature of the space in which it is positioned. The bellows 154 consequently will be expanded so that the arm 146 is in the solid line position shown in the drawing. Under such circumstances the contacts 138 and 140 of the disabling switch 80 will be closed while the contacts 142 and 144 thereof will be open. In the case of the starter break switch 78, the bellows 126 will be expanded so that the contacts 110 and 112 will be closed while the contacts 114 and 116 are open because the pressure in the conduit 178 and the vacuum chamber 180 will approximate atmospheric pressure. Also at this time, the bellows 196 will be expanded because the pressure in the conduit 198 will be approximately at atmospheric pressure so that the choke 30 will close the air intake 200 in which it is mounted. The refrigerant supply valve 54 will be closed because its solenoid 168 is unenergized. The capillary control or expansion valve 58 will be open because the temperature in the end 64 of the evaporator coil 62 will be sufficiently great for causing the bulb 72 to act through the tube 70 for holding said valve 58 open.

It then being desired to bring down the temperature of the space in which the evaporator 62 is positioned, which means bringing down the temperature of the evaporator, the master switch 76 is closed. From this time on the apparatus will function automatically and importantly, without excessive cycling. Upon the closing of the master switch 76 the starter circuit, indicated by the solid line commencing with the conductor 90 from the "hot" line 82 is completed to the ground 150, thereby energizing the coil 92 and closing the switch 84 to complete the circuit from the conductor 82 through said switch, the conductor 86, and the starter 44 to ground at 88, and thus energizing the starter.

The starter cranks the engine 20 sufficiently fast for the magneto 34, in conjunction with the transformer 38 and circuit interrupter 40, to impress the required ignition potential upon the plug 42 at the proper times. Until the engine 20 actually commences to function, the various other circuits and the valves remain substantially in the condition in which they were prior to the closing of the switch 76. The reason for this is that so long as the internal combustion engine 20 is being turned over solely by the starter 44 a sufficient vacuum is not developed in the vacuum chamber 180 to affect the bellows 126 of the starter break switch 78 or the bellows 196 controlling the choke 30.

When the internal combustion engine 20 commences to function it immediately develops a vacuum in the vacuum chamber 180 which is sufficient to collapse the bellows 196 and open the choke so as to admit more air through the air intake 200 to the gas mixture leading to the manifold. The vacuum in the chamber 180 is also sufficiently great to collapse the bellows 126 and overcome the pull of the spring 122 whereby the contacts 110 and 112 are opened, which breaks the starter circuit. When the starter circuit is broken, the coil 92 is deenergized which opens the line to the starter 44, which ceases to function.

It will be noted that upon the movement of the arm 118 of the starter break switch 78 into the dotted line position 202, the contacts 114 and 116 close so that the refrigerant supply circuit is completed from the "hot" line 82 through the solenoid 168 of the refrigerant supply valve 54 to the ground 170. The solenoid 168 opens the valve 54 permitting refrigerant to flow to and through the capillary control valve 58 to the evaporator 62.

The refrigerating apparatus now functions normally while the temperature of the evaporator 62 is lowered at a rate of speed depending upon the amount of refrigerating work to be done thereby. It will be appreciated that there will not be any cycling of the internal combustion engine 20 because the internal combustion engine 20 cannot be stopped excepting by the closing of the two contacts 142 and 144 of the disabling switch 80 which have the effect of grounding the magneto 34 thereby preventing a spark reaching the plug 42.

The drop in temperature of the evaporator 62 will lead the drop in temperature of the space to be refrigerated in the well-known manner. Moreover the size of the temperature differential between the walls of the evaporator 62 and the air in the space to be cooled will depend upon the capacitative relationship of the cooling surface of the evaporator to the space to be cooled. In order to prevent frequent cycling the disabling switch 80 has its spring 150, schematically shown, so adjusted that at a selected high pressure in the conduit 66 and evaporator 62, the disabling switch will be in the position shown in the drawing whereas at a selected low pressure in the conduit 66 and evaporator 62, the bellows 154 will contract so that the arm 146 of the disabling switch 80 moves into the dotted line position 204. Thus the bellows 154 and spring 150 may be adjusted with respect to each other at ten pounds and twenty-seven pounds pressure. When the temperature in the evaporator 62 and conduit 66 becomes sufficiently high so that the pressure therein is twenty-seven pounds, the spring 150 draws the arm 146 to the right and closes the contacts 138 and 140. Conversely when the temperature in the evaporator 62 and conduit 66 has dropped to a given point such that the pressure is, for example, ten pounds, the bellows 154 contracts, thereby opening the points 138 and 140 and closing the points 142 and 144.

When the engine 20 stops, the vacuum in the chamber 180 is slowly dissipated due to atmospheric pressure seeping past the disks 185 and 193 from the manifold side of the line 194, all located within the vacuum control unit 184. The springs 189 and 201 controlling the movements of the wafer valves 185 and 193 respectively, are of low tension and do not seat the valves sufficiently firmly during idle periods to prevent seepage of air from the manifold side of the line into the vacuum chamber 180. As the vacuum in the chamber 180 collapses, the choke 30 moves into closed position and the bellows 126 expands and moves the arm 118 into the position shown. When this occurs, the refrigerant supply circuit is thereby operated at contacts 114—116 to allow closing of the refrigerant supply valve 54. The starter circuit contacts 110—112 of switch 78 are again closed but the starter 44 is not then energized because the contacts 138 and 140 in the disabling switch 80 remain open so long as the sub-low pressure continues in the suction conduit 66. It will be appreciated that it is essential for the starter circuit to be broken in the disabling switch 80 because during automatic operation the master switch 76 remains closed and the starter circuit must not be energized until the spring 150 is able to overcome the collapsed bellows 154 due to a rise in temperature and consequently in pressure in the evaporator 62 and suction line 66.

It will be understood that applicant's invention resides in the arrangement of circuits and the employment of a substantially constant vacuum chamber in connection with a four-cycle, single cylinder engine. The great advantage of applicant's system is that frequent cycling of the gasoline engine is avoided. It of course is recognized that frequent cycling in any refrigeration system is not very desirable although in the case of systems powered with electric motors, the objection to frequent cycling is not so great as in the case of a system powered by an internal combustion engine. It is desired not to use any more current from the "hot" line 82 than is necessary for ordinarily this "hot" line is supplied with current from a wet battery. Where applicant's apparatus is positioned in a truck, the battery will ordinarily be charged by the truck or tractor motor but it is desired to use just as little current as possible.

Having thus described my invention, what I claim as new and desire to secure by Letters Patent of the United States is:

1. A refrigerating apparatus including a four-cycle, single cylinder internal combustion engine, an electric starter therefor, a compressor driven by said engine and positioned in a refrigerant circulating system, a starter circuit for conducting electric energy to the starter, means responsive to a reduced pressure in the engine manifold during the intake stroke thereof for breaking and holding open said starter circuit and means for preventing manifold pressures occurring during the other three strokes of the engine from affecting the starter circuit.

2. A refrigerating apparatus including a four-cycle, single cylinder internal combustion engine, an electric starter therefor, a compressor driven by said engine and positioned in a refrigerant circulating system, a starter circuit for conducting electric energy to the starter, a switch normally closed in said circuit, means responsive to a reduced manifold pressure during the intake stroke of said engine for opening said switch and means for preventing manifold pressures occurring during the other three strokes of the engine from closing said switch.

3. A refrigerating apparatus including a four-cycle, single cylinder internal combustion engine, an electric starter therefor, a compressor driven by said engine and positioned in a refrigerant circulating system, a starter circuit for conducting electric energy to the starter, a switch in said starter circuit, a bellows connected to said switch to open the same upon the reduction of pressure in said bellows, a conduit connecting said bellows to the intake manifold of said engine, and means positioned in said conduit for limiting the pressure imposed thereby on the bellows to substantially the pressure obtaining during the intake stroke only of said engine during engine operation.

4. A refrigerating apparatus including a four-cycle, single cylinder internal combustion engine, an electric starter therefor, a compressor driven by said engine and positioned in a refrigerant circulating system, a starter circuit for conducting electric energy to the starter, a switch in said starter circuit, a bellows connected to said switch to open the same upon the reduction of pressure in said bellows, a conduit connecting said bellows to the inlet manifold of said engine, and means positioned in said conduit for limiting the pressure imposed thereby on the bellows to substantially the pressure obtaining during the intake stroke only of said engine during engine operation, said means comprising a valve adapted to open only when the pressure in the engine manifold is less than the pressure in the bellows.

5. A refrigerating apparatus including a four-cycle, single cylinder internal combustion engine, an electric starter therefor, a compressor driven by said engine and positioned in a refrigerant circulating system, a starter circuit for conducting electric energy to the starter, a switch in said starter circuit, a bellows connected to said switch to open the same upon reduction of pressure in said bellows, a conduit connecting said bellows to the intake manifold of said engine, and means positioned in said conduit for limiting the pressure imposed thereby on the bellows to substantially the pressure obtaining during the intake stroke only of said engine during engine operation, said means comprising a chamber positioned in said conduit and a vacuum control unit positioned between said chamber and the engine manifold, said vacuum control unit having two wafer valves arranged in series therein adapted to open only when the pressure in the chamber exceeds the pressure in the engine manifold.

6. A refrigerating apparatus including a four-cycle single cylinder internal combustion engine, a compressor driven by said engine and positioned in a refrigerant circulating system, an electric starter for said engine, an electric circuit connected to a source of power for functioning said starter, a solenoid controlled switch positioned in said electric circuit, a starter circuit including the coil of said solenoid switch therein and normally connected to a source of power so as to hold said solenoid switch in closed position, means responsive to the reduced pressure of the intake stroke of said engine in the manifold for opening said starter circuit and thereby stopping the starter, and means for preventing manifold pressures occurring during the other three strokes of the engine from affecting the starter circuit.

7. In a refrigerating apparatus of the intermittent cycling type wherein a four-cycle single cylinder internal combustion carbureted engine driving a compressor positioned in a refrigerant circulating system is to be automatically started by mechanism which is to be disabled immediately thereafter: the combination of an electric starter for said engine, a starter circuit normally connected to a source of power for functioning said starter, means having a reduced pressure zone communicative with the engine intake manifold and serving during operating of said engine to maintain a reduced pressure in said zone substantially equal to that existing in the manifold during intake strokes of the engine, means responsive to the reduced pressure in said zone for opening said starter circuit, a choke for the engine carburetor, said choke being normally held in a closed position, and means responsive to the reduced pressure in said zone for moving said choke into an open position, whereby when the engine is at rest the starter circuit and the carburetor will be in condition for quickly starting the same and upon the engine's starting, the starter circuit will be disabled and the choke will cease to function.

8. In an automatic refrigerating apparatus of the intermittent cycling type wherein a gas engine drives a compressor positioned in a refrigerant circulating system and an electric starter is operably associated with the gas engine; the combination of a starter circuit for supplying electric energy to the starter, switch means responsive to a reduced pressure in the manifold of said engine for opening said starter circuit, and a second switch in said starter circuit in series with the first switch and adapted to open said circuit in response to pressure conditions in the refrigerant circulating system.

9. In a refrigerating apparatus of the intermittent cycling type wherein a four-cycle single cylinder gas engine drives a compressor positioned in a refrigerant circulatory system including an evaporator and wherein an electric starter is operably associated with said engine: the combination of a starter circuit for supplying electric energy to the starter, a starter break switch positioned in said starter circuit and means adapted to open said switch and hence said circuit in response to reduced pressure in the engine intake manifold during intake strokes of said engine, a disabling switch mounted in said starter circuit in series with said starter break switch and means for opening said disabling switch to open said starter circuit in accordance with a selected low temperature in the evaporator coils.

10. In a refrigerating apparatus of the intermittent operating type wherein a four-cycle, single cylinder gas engine drives a compressor positioned in a refrigerant circulating system and an electric starter is operably connected to the gas engine: the combination of a starter circuit adapted to function the starter, circuit breaking means responsive solely to the reduced pressure of the intake stroke of said engine for opening said starter circuit, switch means having one setting in which it is operable to open the starter circuit and concurrently disable the running of the engine and having another setting in which it closes said starter circuit, and switch operating means responsive to a reduced pressure in the evaporator for incurring such open setting of said switch means and responsive to a subsequent increase in the evaporator pressure to incur such closed setting of said switch means, whereby when said switch operating means functions, the circuit breaking means will cease to function because of the stopping of said engine and the starter circuit is placed in readiness for functioning the starter when the switch means resumes its closed setting.

11. In a refrigerating apparatus of the intermittent operating type including a four-cycle, single cylinder gas engine driving a compressor in a refrigerant circulating system containing an evaporator and an electric starter operably connected to the gas engine: the combination of a starter circuit, a starter break switch responsive solely to the reduced pressure of the intake stroke of said engine for opening said starter circuit, a disabling circuit connected to the ignition circuit of the gas engine, disabling switch means having a component positioned in said starter circuit in series with said starter break switch to open such circuit when such disabling switch means is operated to an open setting and to close such circuit when such switch means is operated to a closed setting, said switch means also having a component in said disabling circuit for connecting the same to ground when the disabling switch means is in the open setting and to remove said ground connection when the disabling switch means is in the closed setting and operating means for said switch means to incur the open setting thereof in response to a decrease of pressure in the evaporator and to incur the closed setting thereof in response to a subsequent increase of such pressure.

12. In a refrigerating apparatus of the intermittent cycling type including an ignition type gas engine driving a compressor in a refrigerant circulating system having an evaporator, a solenoid controlled valve in the line for supplying liquid refrigerant to said evaporator and an electric starter operably connected to said gas engine: the combination of a starter circuit for energizing the starter, a disabling circuit for grounding the engine ignition circuit to stop said engine, a refrigerant supply control circuit including the coil of the solenoid controlled valve and adapted to open said valve when energized, and a multiple starter break switch positioned in the starter circuit and in the refrigerant supply control circuit, switch operating means operable to open the starter circuit and close the refrigerant supply control circuit in response to a reduced pressure derived solely from the intake stroke of said engine when it is operating, a disabling switch positioned in the starter circuit in series with the starter break switch and also positioned in the engine disabling circuit, and a second switch operating means operative upon said disabling switch to open the starter circuit and close the disabling circuit concurrently in accordance with a selected low temperature in the evaporator.

13. The refrigerating apparatus described in claim 12 and an expansion valve responsive to temperature conditions of the evaporator controlling the supply of refrigerant to the evaporator.

14. In a refrigerating apparatus of the intermittent cycling type wherein a four-cycle, single cylinder gas engine drives a compressor in a refrigerant circulating system having an evaporator and wherein an electric starter is operably connected to the gas engine: the combination of a starter circuit including switch means and adapted to function the starter until said switch means is opened, switch operating means responsive solely to pressure variations of the intake stroke of said engine to open said switch means, a disabling circuit connectible with ground for grounding the engine ignition circuit to stop said engine, a disabling switch for connecting said disabling circuit with ground, a refrigerant supply controlling valve in the line for supplying liquid refrigerant to the evaporator, a capillary control tube mounted on the evaporator and operably connected to said valve for shutting off the supply of the refrigerant to the evaporator when the evaporator has reached a selected low temperature, and means responsive to the abnormally low pressure in the evaporator occurring after the shutting off of the refrigerant supply for operating said disabling switch to ground said disabling circuit and thereby stop the gas engine.

THOMAS C. KILLORAN.